Sept. 2, 1924.

H. O. WILSON

SCOOTER

Filed April 23, 1923

1,507,541

WITNESSES

INVENTOR
HARVEY O. WILSON
BY
ATTORNEYS

Patented Sept. 2, 1924.

1,507,541

UNITED STATES PATENT OFFICE.

HARVEY ORVIS WILSON, OF WILMINGTON, DELAWARE.

SCOOTER.

Application filed April 23, 1923. Serial No. 634,111.

*To all whom it may concern:*

Be it known that I, HARVEY O. WILSON, a citizen of the United States of America, and a resident of Wilmington, in the county of New Castle and State of Delaware, have invented a new and Improved Scooter, of which the following is a description.

My invention relates to a scooter and has for its general object to provide a scooter improved in various particulars especially with respect to pedal-operated drive means and with respect to a brake for the front or steering wheel.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1:
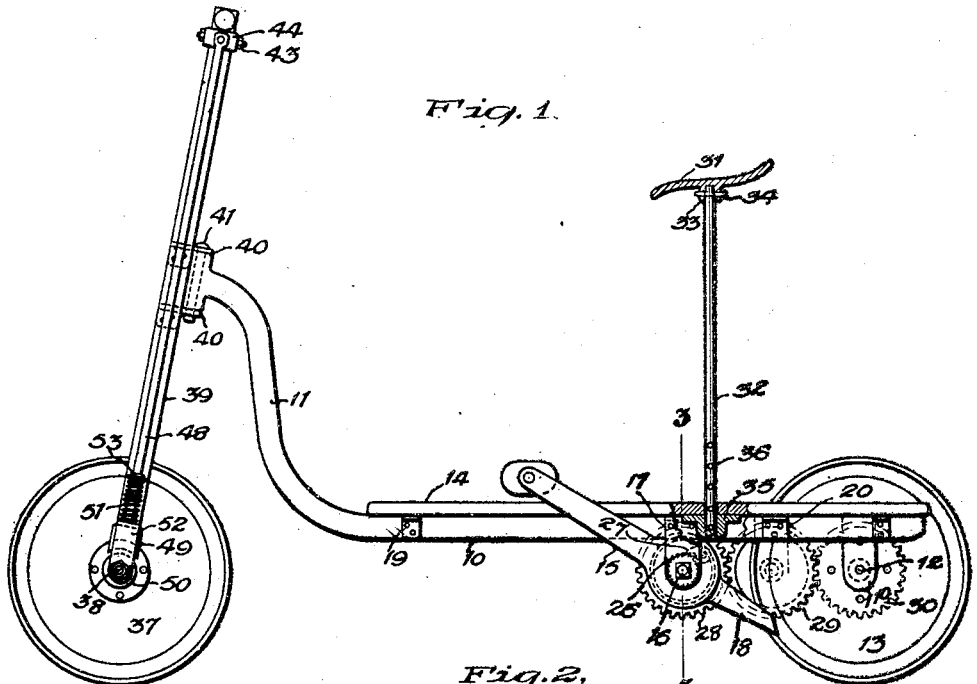
Figure 1 is a side elevation of a scooter embodying my invention, a portion being broken out to show the seat post.
Figure 2:
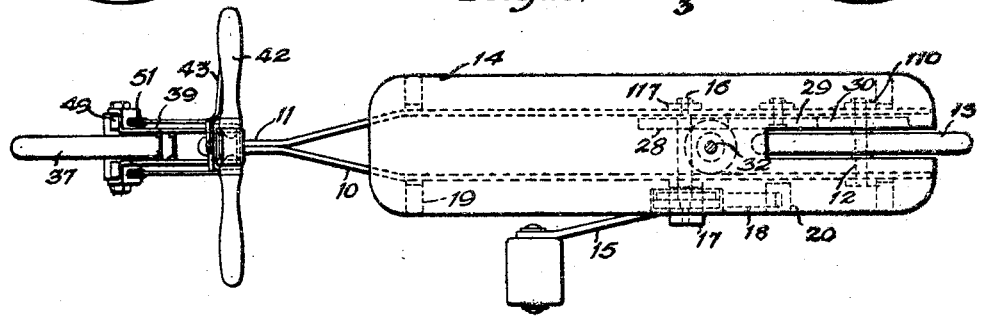
Figure 2 is a plan view.
Figure 5:
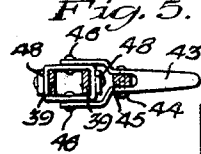
Figure 5 is a sectional plan view as indicated by the line 5—5, Figure 4.
Figures 3, 4:
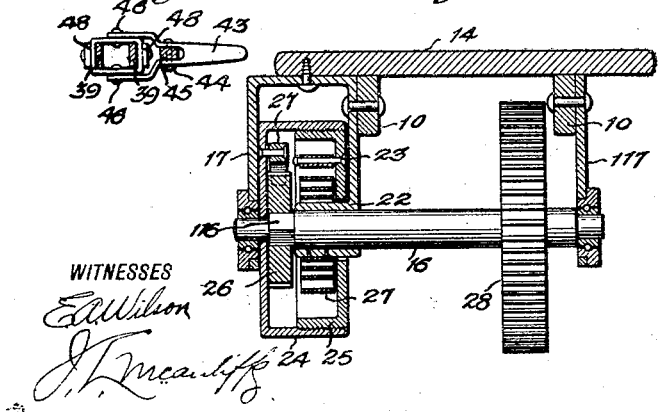
Figure 3 is an enlarged transverse section as indicated by the line 3—3 in Figure 1.
Figure 4 is a front elevation showing the upper portion of the steering post and brake lever.

In carrying out my invention in accordance with the illustrated example a frame 10 is provided comprising longitudinal side bars convergent and forming jointly at the front end an upwardly extending head 11 on which the steering post is mounted as hereinafter described.

Depending from the frame 10 are hangers 110 in which the axle 12 of the rear wheel 13 is mounted. On the frame 10 is a platform 14 on which the user of the scooter may stand on one foot. A pedal 15 is disposed at one side of the frame and extends laterally inward beneath the platform 14. A transverse shaft 16 turns in hanger brackets 17 and 117 at the opposite sides of the frame 10. The platform 14 may be braced by angle brackets 19 and 20.

Rigid with the pedal 15 and extending at the opposite side of the shaft 16 is a projecting member 18 which will contact with the under side of the platform 14 or with the bracket 20 which may have a buffer block in practice, the arrangement serving to limit the movement of the pedal about its axis should the pedal be depressed to an abnormal extent.

The pedal is raised after each depression by a spring 21 in the form of a flat coil after the manner of a clock spring, said spring being secured at its end to a hub 22 on the inner side of bracket 17, the outer end of the spring being secured as at 23 to a housing 24 rigid with the pedal 15 and enclosing said spring. The inner side or section 25 of the housing 24 is separate and has threaded engagement with the flange of the outer side of said housing.

Rigid on the axle 16 is a ratchet wheel 26 which is adapted to be engaged by a pawl 27 pivoted to the housing 24 at the interior. Thus, the spring 21, ratchet 26 and pawl 27 are within said housing 24. The ratchet 26 is rigid on a squared portion 116 of the shaft 16. Thus, the depression of the pedal 15 will, through the pawl 27, rock housing 24 about shaft 16, actuate the ratchet wheel 26 and thereby turn the shaft 16. A drive connection is established between shaft 16 and the rear axle 12 through the medium of a train of gear wheels of which the initial wheel 28 is on the shaft 16 and the final wheel 30 on the axle 12, said wheels 28 and 30 meshing with an intermediate toothed wheel 29. Thus, with the depression of the pedal the axle 16 will be turned and through the wheels 28, 29, 30 will impart a forward turning movement to the wheel 13.

In the illustrated example I have equipped the scooter with a seat 31 mounted on a post 32, said seat having a depending boss 33 at the under side fitting the top of the post 32, and there being a transverse fastener pin passing through said boss 33 and said post 32. The lower end of the post 32 passes through the platform 14 and through a boss 35 having a flange secured to said platform. A transverse pin fastens the lower end of post 32 the same as the seat 31 is fastened, for which purpose one or a vertical series of holes 36 may be formed in the post 32 so that a pin can pass through the boss 35 and through said post 32. I have shown a series of holes 36 in order that the seat 31 may be adjusted vertically.

The front wheel 37 is on an axle 38 in the front fork or steering post 39. The steering post 39 has rearwardly extending members 40 through which a pivot pin 41 extends, said pin extending through the front end of the head 11, thereby permitting said post 39 to be turned laterally through an arc with the pin 41 as a center. The upper end of the steering post 39 has a cross handle 42. Beneath the cross handle 42 is a brake lever 43. The lever 43 is fulcrumed as at 44 to a depending bracket 45 on the under side of the cross handle 42 and said lever is forked and pivoted as at 46 to opposite sides of a band 47 extending about steering post 39. Extending downwardly from the band 47 are brake rods 48 equipped with brake shoes 49 at the lower ends. The brake shoes 49 are adapted by an operation of the lever 43 to be depressed against the hub 50 of steering wheel 37. Normally, the brake shoes 49 are held raised and out of contact with the hub 50 by springs 51 coiled about the brake rods 48, the springs at the lower ends abutting against the fork 52 of steering post 39 and abutting at their upper ends against collars 53 on the brake rods 48.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A scooter including a frame, a transverse turnable shaft supported from the frame, a pedal, a housing rigid with the pedal and adapted to rock therewith about the axis of said shaft, a coiled spring within said housing and secured at one end thereto, a member rigid with the frame and having a hub concentric with said shaft to which hub said spring is secured at its other end, an axle turnably supported from the frame, a running wheel on said axle, and a drive connection between said shaft and said axle.

2. A scooter including a frame, a transverse shaft turnable in the frame, a pedal, a housing rigid with the pedal and adapted to rock therewith about the axis of said shaft, a coiled spring within said housing and secured at one end thereto, a member rigid with the frame to which member said spring is secured at its opposite end, a running wheel, and means to drive said running wheel from said shaft.

HARVEY ORVIS WILSON.